US008123146B2

(12) United States Patent
Hawley et al.

(10) Patent No.: US 8,123,146 B2
(45) Date of Patent: Feb. 28, 2012

(54) WIRE COMBUSTION WITH INCREASED APPLICATION RATES

(75) Inventors: David Hawley, Kings Park, NY (US); Ronald J. Molz, Mt. Kisco, NY (US); James Leach, Enfield, CT (US)

(73) Assignee: Sulzer Metco (US) Inc., Westbury, NY (US)

( * ) Notice: Subject to any disclaimer, the term of this patent is extended or adjusted under 35 U.S.C. 154(b) by 204 days.

(21) Appl. No.: 11/657,664

(22) Filed: Jan. 25, 2007

(65) Prior Publication Data

US 2007/0170274 A1 Jul. 26, 2007

Related U.S. Application Data

(60) Provisional application No. 60/762,135, filed on Jan. 26, 2006.

(51) Int. Cl.
*B05B 1/24* (2006.01)
*A01G 25/09* (2006.01)

(52) U.S. Cl. .................... 239/1; 239/79; 239/83; 239/84

(58) Field of Classification Search .............. 239/79–85, 239/1
See application file for complete search history.

(56) References Cited

U.S. PATENT DOCUMENTS

| | | | | |
|---|---|---|---|---|
| 3,171,774 | A | 3/1965 | Wheildon, Jr. | |
| 3,329,558 | A | 7/1967 | Wheildon, Jr. | |
| 4,593,856 | A * | 6/1986 | Browning | 239/83 |
| 4,960,458 | A * | 10/1990 | Browning | 427/449 |
| 4,975,032 | A * | 12/1990 | Arai et al. | 418/150 |
| 7,335,854 | B2 * | 2/2008 | Hutchison | 219/137.71 |

FOREIGN PATENT DOCUMENTS

FR 2 681 538 3/1993

OTHER PUBLICATIONS

English language Abstract of FR2 681 538.
European search report and opinion of EP 07 10 0393.

* cited by examiner

*Primary Examiner* — Christopher Kim
(74) *Attorney, Agent, or Firm* — Greenblum & Bernstein, P.L.C.

(57) ABSTRACT

Shaping the feed wire for a combustion wire thermal spray process improves the operating capability of the combustion wire gun through higher feed rates and high operating efficiencies. The efficiency of the wire melting is increased over conventional systems through increasing the surface area of the wire cross section and exposing more of the wire material directly to the burner jets.

18 Claims, 6 Drawing Sheets

WIRE COMBUSTION WITH INCREASED APPLICATION RATES

CROSS REFERENCE TO RELATED APPLICATIONS

This application claims priority under 35 U.S.C. §119(e) from U.S. Provisional Patent Application Nos. 60/762,135, filed on Jan. 26, 2006, which is incorporated herein in its entirety by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The present invention relates generally to the field of flame spray methods and apparatus. Specifically, the invention relates to a combustion wire thermal spray process using wire cross sections that allow for greater application rates.

2. Description of Related Art

Combustion wire thermal spray has been in used for a number of decades to produce metallic coatings for a variety of applications. A combustion wire gun is limited in the amount of material that can be processed per unit time. The process rate depends upon the size of the gun, gas flow rates, size (diameter) of the wire, and the properties of the wire (melting point, specific heat, etc.). For most applications the process rate is sufficient to provide an economical means of coating but high volume and high speed applications have been restricted. For field or on-site work contracting applicators of thermal spray coatings set pricing rates based upon the amount of material sprayed not on the amount of time it takes which leads to incentives to increase productivity via throughput. In large scale corrosion applications on manufacturing lines, the use of as many as 20 process guns on a single production line may be required, with the accompanying multiplication of complexity as well as utility consumption. This limitation in process rate has restricted combustion wire thermal spray from high volume applications, thus a need exists to provide a means to increase the process rate of a single combustion wire gun.

Recent experimentation and disclosure of methods to preheat the wire have demonstrated a potential to increase the process rate considerably, but even higher process rates are needed to substantially decrease the number of guns needed for high volume applications. Since most thermal spray processes operate at very low efficiencies in terms of the energy supplied versus the energy required to perform the process there is demonstrated potential to increase process rate considerably.

Currently almost all thermal spray wires have a round cross section with an exception of some having been square. The round shape is actually the least appealing shape to use in a process where heat needs to be transferred through the surface as a round wire has the least exposed surface per unit volume and subsequently mass. Thus there is a theoretical and physical potential to improve combustion wire thermal spray through improvement of the feed stock wire shape.

A concern with regard to improving the process is the understanding that there is a need to maintain a seal between the wire and the bushing or sleeve used to guide the wire into the combustion region. If there is not a sufficient seal then there is a strong possibility that during shutdown the combustion gases will reverse back up the wire path and cause a backfire.

Another item to note is the general requirement that the cross sectional shape of the wire needs to coincide with the shape of the combustion flame such that the wire and combustion flame are concentric in order to ensure the wire is melted uniformly in the combustion flame. The use of wire guides and other means to present the wire concentrically to the flame have been incorporated in various forms since the initial invention of combustion flame spray guns.

SUMMARY OF THE INVENTION

The present invention meets the aforementioned needs by providing a combustion wire thermal spray process using wire cross sections that allow for increased wire feed rates and improved thermal efficiency. The efficiency of the wire melting is increased over conventional systems through increasing the surface area of the wire cross section and exposing more of the wire material directly to the burner jets.

In one aspect of the invention, a combustion wire thermal spray system is provided. The system includes a wire feed system; a wire feedstock wherein said wire feedstock has a cross-section, said cross-section having a perimeter greater than $$\frac{2}{\sqrt{\pi}}$$

times the perimeter of a circle with equal interior area; and a combustion wire gun having a combustion chamber producing a substantially annular flame for melting a wire feedstock and at least one set of feed rollers for directing the wire feedstock from the wire feed system into the combustion chamber.

Another aspect of the invention, a method of generating combustion wire thermal spray is provided. The method includes providing a wire with a cross-section that has a perimeter greater than $$\frac{2}{\sqrt{\pi}}$$

times the perimeter of a circle with equal interior area; and feeding the wire through one or more sets of feed rollers into a combustion wire gun.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
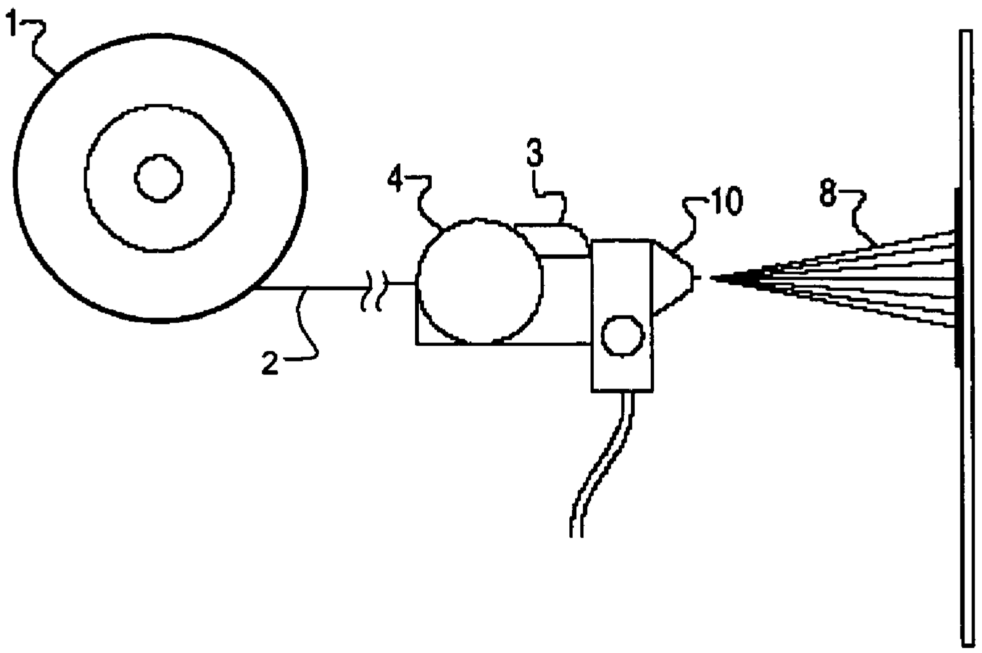
FIG. 1 provides a schematic of a conventional combustion wire spray gun for use in accordance with the present invention.

FIG. 1 provides a schematic of a conventional combustion wire spray gun which may be used in accordance with the present invention. As shown in FIG. 1, a thermal spray wire 2 (typically drawn from a wire feedstock roll 1) is fed into a combustion wire gun 3 via feed rollers 4 or similar mechanisms. The feed rollers 4 push the wire 2 through the gun 3, including through a combustion chamber 10, where the wire 2 is bombarded by heated gases that heat and melt the wire 2 and propel the melted wire particles 8 onto a substrate. One factor that limits the amount of material that can be processed by the combustion wire gun is the rate at which the wire can be converted from a solid to molten particles.

Shaping of a thermal spray wire 2 to increase the surface area provides two distinct benefits for the process of heating and melting the wire. The first benefit is there is more material initially exposed to the combustion heat and as such the transfer of thermal energy to the wire is higher. Second the depth to which the heat must penetrate is also reduced per unit mass thus shortening the required dwell time in the combustion flame before complete melting occurs. The sum of these benefits permits substantially higher wire feed rates at equal gun operating parameters.

The ideal wire shape would expose a considerable amount of the wire surface per unit mass to the combustion flame. For a theoretical point of view a flat ribbon or oval shape would provide an optimal amount of surface area per enclosed volume. The flatter the ribbon or oval the more surface are there would be for the volume contained and an infinitely thin ribbon would have infinite surface area and infinitesimal contained volume. From a practical standpoint the processing of such a wire in a combustion gun would be difficult and the results of heating and melting in a concentric flame (typical of most spray guns) would be less than ideal the flatter the ribbon or oval was. Thus, referring to FIG. 1 as an example, the gas pattern in combustion chamber 10 should be factored into a selection of the optimal cross-sectional shape of the wire 2.

Cross-sectional wire shapes such as a simple cross with four legs can have over twice the perimeter for a fixed cross sectional area respective to a circle. The practical aspects of using a cross shaped wire are limited as the cross shape will be altered or damaged by rolling the wire onto wire spools typically used to feed wire and the feeding of the wire into a combustion gun itself. With prudent modifications to commercial spooling methods and commercial feeding mechanisms the use of cross shapes can be used; however it is desirable to require little or no modification to current equipment and practices that could add considerable cost to the process. Thus, referring to FIG. 1 as an example, the feedstock 1 handling and the feed techniques for the wire combustion gun 3 should be factored into a selection of the optimal cross-sectional shape of the wire 2.

Figure 2A:
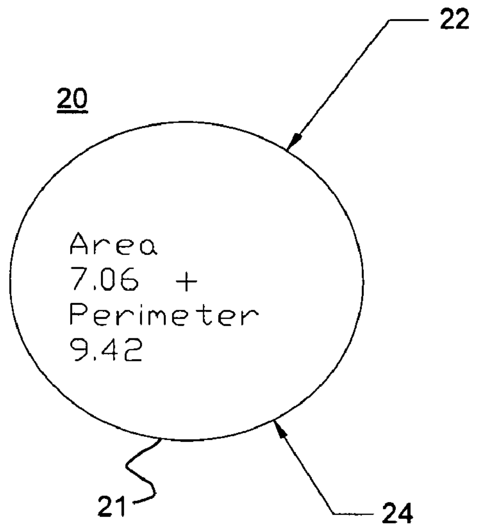
FIG. 2A (Prior Art)
FIG. 2A provides a conventional feed wire cross section.
Figure 2B:
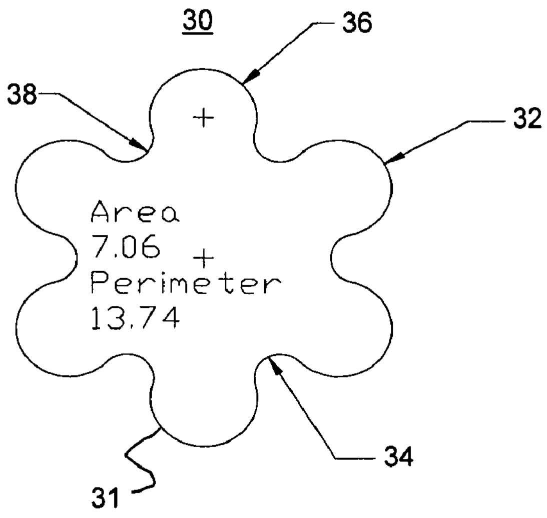
FIG. 2B provides a cross-section of a feed wire in accordance with an embodiment of the present invention.

A more practical form to use would be a star or gear shape with multiple points or lobes. Shapes similar to that desired are currently extruded or drawn for other applications in industry such as pinion gear stock. These shapes are also practical to feed using typical feed rollers employed in combustion wire guns. The increase in surface area, although not as dramatic as using a flat ribbon, are still significant. FIGS. 2A and 2B provide a comparison of a conventional feed wire cross section and a cross-section of a feed wire in accordance with an embodiment of the present invention. FIG. 2B depicts an example of a flower shaped cross-section with six lobes showing an increase of 46% of the perimeter as compared to a circular cross-section of equal area in FIG. 2A. For the particular arrangement of FIG. 2B, a wire cross section 20 has a diameter 22 of 3.0 units and a radius 24 of 1.5 units, providing an area of the cross section 20 of about 7.06 square units with a perimeter 21 of 9.42 units. The six-lobed embodiment of FIG. 2B has a largest diameter 32 of 3.55 units and an inner radius 34 of 1.08 units. Each of the six lobes has a radius 36 of 0.45 units and are joined with a section 38 having a 0.23 unit radius. The resulting six-lobe cross section 30 has the same area (7.06 square units) as the circular cross section 20 of FIG. 2A. However, the perimeter of the six-lobed cross section 30 is 13.74 units. While FIG. 2B depicts a six-lobed shape, any number of lobes can be used to provide a beneficial increase in surface area.

Figure 3:
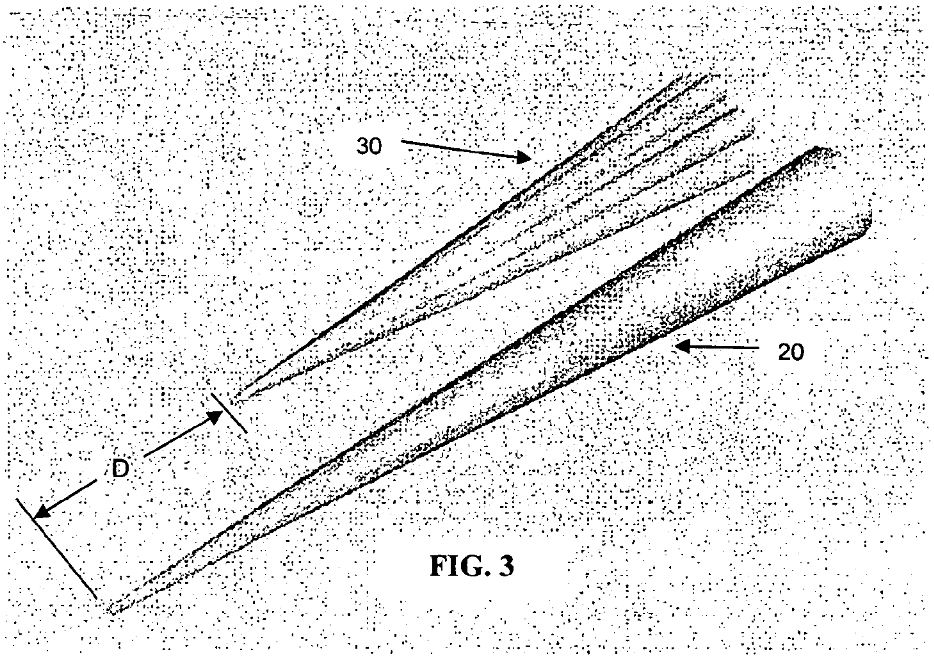
FIG. 3 provides an isometric comparison of a conventional feed wire and a feed wire in accordance with the present invention.

In contrast with the conventional wire of FIG. 2A, as the shaped wire (e.g., FIG. 2B) is exposed to the combustion process the additional surface area provides for more transfer of heat from the combustion gasses to the wire material thus increasing the heating and melting rate. FIG. 3 shows a simple theoretical melting of a convention wire 20 and a shaped wire 30 with equal exposed area. If both wires are moving at the same speed the shaped wire 30 would melt noticeably sooner than the round wire 20, as evidenced by the distance D in FIG. 3. Hence the shaped wire can be fed faster, melting more material per unit time. What is not indicated in FIG. 3 is that, as the melting occurs, the overall shape would be roughly maintained as the wire melted from the outside in and this would maintain an increased surface area relative to the round wire in which the exposed area would melt quicker than the partially-melted portion of wire 30 depicted in the diagram.

Generally taking the exposed surface area only as the determining factor for rate of melting, an improvement of as much as 125% in the amount of material that can be sprayed is realized using the 6-lobe shape of FIG. 2B. Additional factors such as the ability to use a larger overall wire size, and hence mass per unit length, could result in even higher feed rate improvements. In embodiments of the present invention improved feed rates can be obtained using virtually any cross-sectional shape that is accommodated by the gun feeding system and can provide relatively uniform spray characteristics when passed through the gun's combustion chamber. Thus, embodiments of the invention would include, a shaped wire having a cross-section with a perimeter greater than $$\frac{2}{\sqrt{\pi}}$$

times the perimeter of a circle with equal interior area (i.e., a perimeter greater than that of a square wire of equal cross-sectional area).

Experimental Procedures

A stock ⅛" diameter round bronze wire and a commercially available pinion gear stock with 10 lobes made of similar brass material with similar melting points was sprayed and compared using a Sulzer Metco 14E combustion wire gun. The two wires had the following characteristics:

| | Round Wire | Shaped Wire |
|---|---|---|
| Diameter: | ⅛" | 3/16" outer dia., ⅛" inner dia. |
| Volume per inch of length: | .2 cc | .3 cc |
| Approximate melting point: | 1030 degrees C. | 930 degrees C. |
| Cross section area: | 7.74 $mm^2$ | 13.2 $mm^2$ |
| Surface area per inch of length: | 258 $mm^2$ | 336 $mm^2$ |
| Mass per inch of length: | 1.52 g | 2.68 g |

The gear stock was chosen specifically to exemplify the realization of maximum practical performance gain not only in terms of surface area but to demonstrate the ability to use a larger wire. The central diameter of the gear stock matches the stock ⅛" round wire while the lobes increase the outer diameter to 3/16". No modifications to the 14E gun were needed to feed or spray the wire. One-eighth inch gun hardware was used with the round wire and 3/16" gun hardware was used with the shaped wire.

Figure 4:
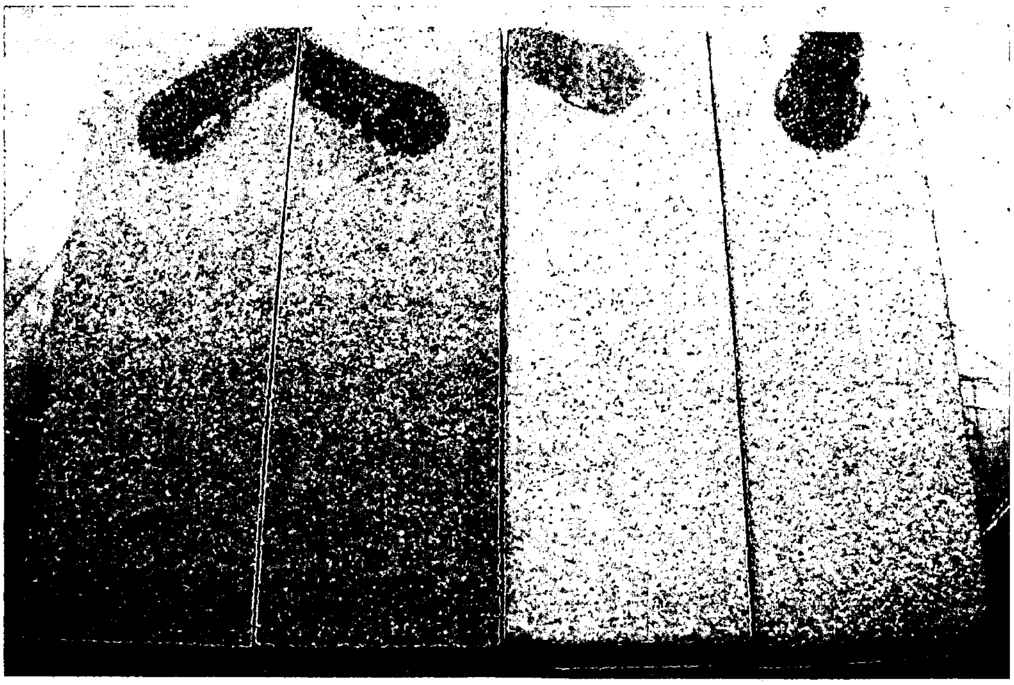
FIG. 4 provides a comparison of actual coatings produced with conventional round wire and with lobed shaped wire in accordance with an embodiment of the present invention.

Both wires were fed into the same 14E gun in two spray runs, one run was done with the round wire, and one with the shaped wire. The same operating gas flows and conditions were used for both runs. The speed of the wire in each case was increased until the point in which the occurrence of spitting started and then reduced until the spitting just stopped. The speed of the wire was then used to calculate the feed rate for each wire. For the round wire the maximum feed rate achievable was 137 g/min. For the shaped wire the maximum feed rate achieved was 443 g/min, a 223% improvement. In both runs the deposit efficiency (mass of wire ending up on the substrate/mass of wire sprayed×100%) was approximately the same at around 80%, and the resulting coating had the same finish appearance and properties, as shown in FIG. 4. FIG. 4 provides a comparison of actual coatings produced with conventional round wire (two left boards) and ten-lobed shaped wire (two right boards).

Some of the additional feed rate obtained with the shaped wire can be attributed to the slightly lower melting temperature, but the majority of the increased rate is due to the increase in exposed surface area.

The potential for backfiring resulting from the exposed regions between the lobes of the shaped wire allowing reverse gas flow are minimized by the fact the during shutdown of the gun the exposed gaps tend to close up with solidifying feed stock which then prevents backflow of gas through the wire feed path. During actual testing no backfiring was observed to have occurred.

Figure 5:
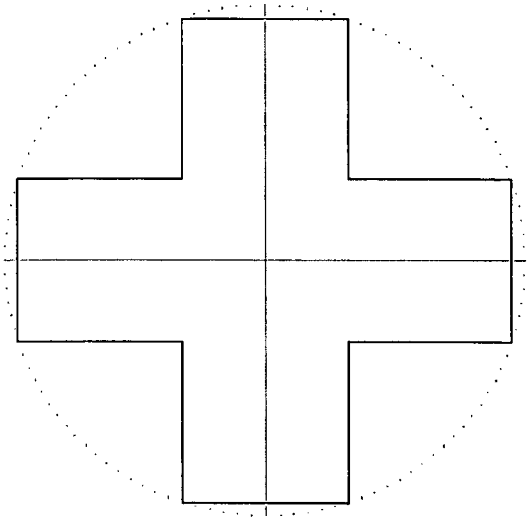
FIG. 5 provides a cross-shaped cross section of a feed wire in accordance with an embodiment of the present invention.
Figure 6:
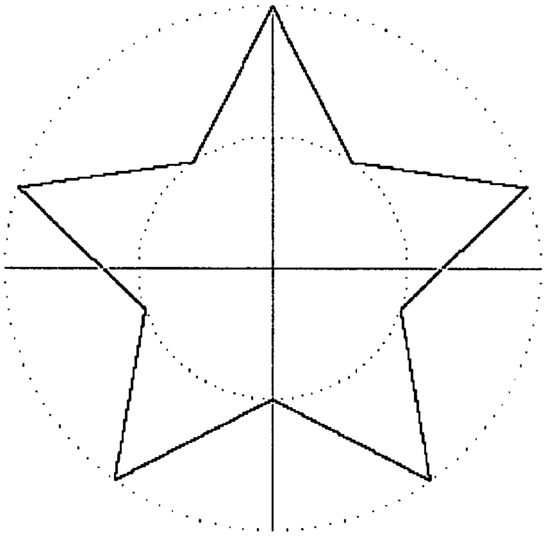
FIG. 6 provides a star-shaped cross section of a feed wire in accordance with an embodiment of the present invention.
Figure 7:
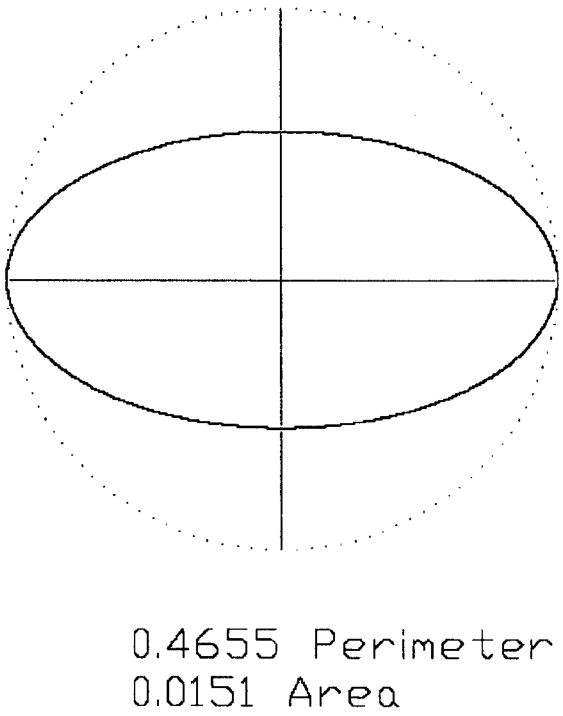
FIG. 7 provides a flattened oval or ribbon cross section of a feed wire in accordance with an embodiment of the present invention.
Figure 8:
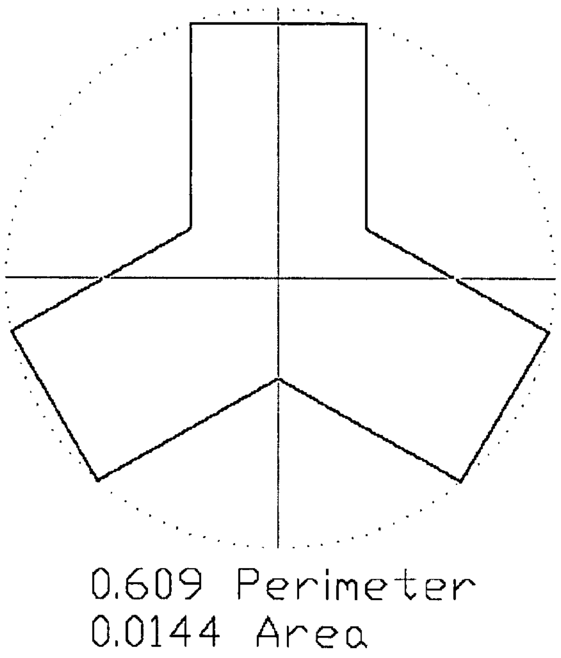
FIG. 8 provides a three-legged cross section of a feed wire in accordance with an embodiment of the present invention.
Figure 9:
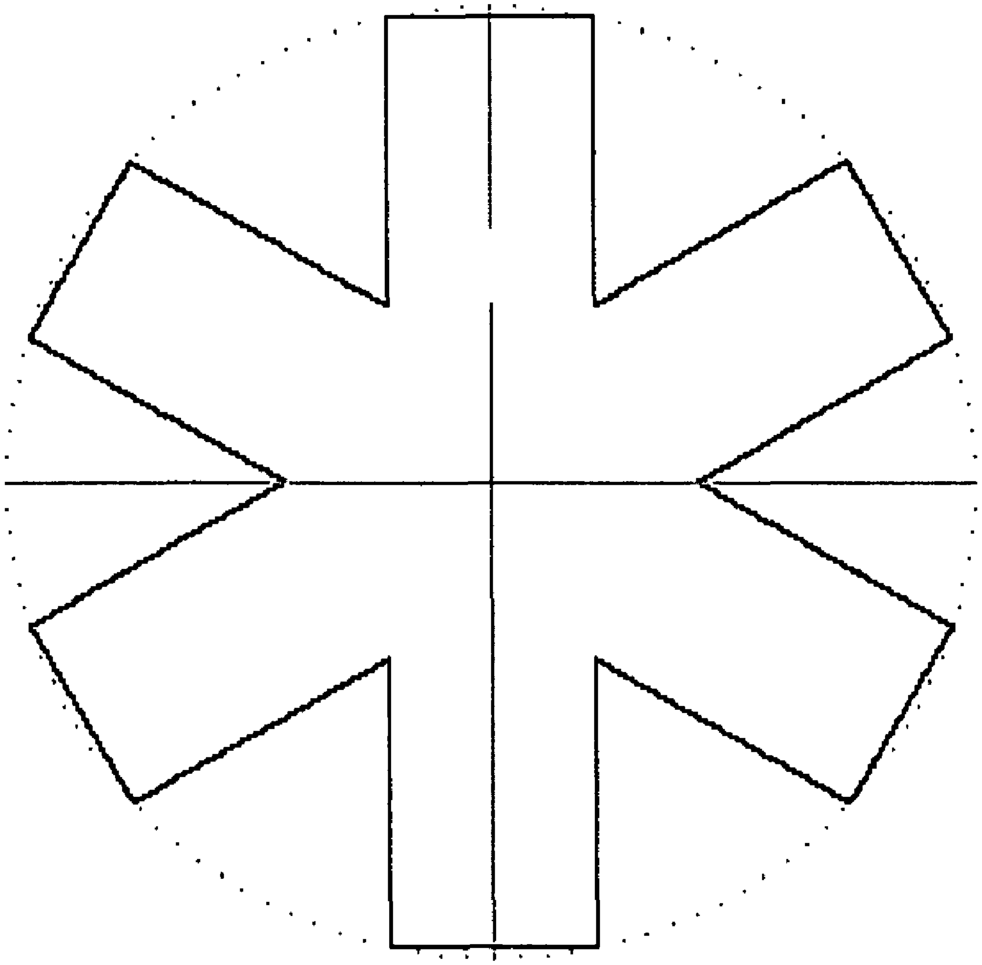
FIG. 9 provides a six-legged cross section of a feed wire in accordance with an embodiment of the present invention.

Given the teachings and example above any one skilled in the art can immediately envision other possible shapes for the wire that could be fed into a combustion wire gun to facilitate increased surface area per unit mass and thus higher feed rates. FIGS. 5-9 provide representative examples of other suitable cross section shapes. FIG. 5 provides a cross-shaped cross section having a perimeter of 0.7106 units for an area of 0.0177 square units. While FIG. 5 shows four legs, any section with three or more legs may be used. For example, FIG. 8 provides an exemplary three-leg cross section having a perimeter of 0.609 units for an area of 0.0144 square units, and FIG. 9 provides an exemplary six-leg cross section having a perimeter of 0.9234 units for an area of 0.0178 square units. FIG. 6 provides a star-shaped cross section having a perimeter of 0.6227 units for an area of 0.0129 square units. While FIG. 6 shows five points, any cross-section with three or more points may be used. FIG. 7 provides a flattened oval or ribbon cross section, which may be most effective for use with a gun having an oval-shaped combustion chamber. The flattened oval for FIG. 7 has a perimeter of 0.4655 units for an area of 0.0151 square units Further improvements in wire feed rates may be obtained by combining the concepts disclosed herein with wire preheating techniques for combustion thermal spray processes, such as those disclosed in commonly assigned and co-pending U.S. patent application Ser. No. 11/190,002, filed Jul. 27, 2005, which is incorporated herein by reference.

The above description shows only some preferred embodiments of the invention and others are likely to come to mind in terms of optimization of the surface area exposed to the combustion flame. For example, a scalloped or toothed perimeter may also provide desired results. Thus, while exemplary embodiments of the invention have been shown and described herein, it will be obvious to those skilled in the art that such embodiments are provided by way of example only. Numerous insubstantial variations, changes, and substitutions will now be apparent to those skilled in the art without departing from the scope of the invention disclosed herein by the Applicants. Accordingly, it is intended that the invention be limited only by the spirit and scope of the claims, as they will be allowed.

The invention claimed is:

1. A combustion wire thermal spray system, comprising:

a wire feedstock having a cross-sectional surface perpendicular to a feedstock feed direction with a perimeter greater than $$\frac{2}{\sqrt{\pi}}$$

times a perimeter of a circle with an interior area equal to an interior area of the cross-sectional surface;

the wire feedstock comprising a single solid gear-shaped wire having rounded convex lobes and rounded concave surfaces arranged between the rounded convex lobes; and a combustion wire gun comprising a combustion chamber adapted to produce a flame for melting the wire feedstock, wherein each rounded concave surface is defined by a first radius and each rounded lobe is defined by a second radius, and the first radius is equal to (1.08 divided by 3.55) times the second radius.

2. A combustion wire thermal spray system, comprising:

a wire feedstock having a cross-sectional surface perpendicular to a feedstock feed direction with a perimeter greater than $$\frac{2}{\sqrt{\pi}}$$

times a perimeter of a circle with an interior area equal to an interior area of the cross-sectional surface;

the wire feedstock comprising a single solid gear-shaped wire having rounded convex lobes and rounded concave surfaces arranged between the rounded convex lobes; and a combustion wire gun comprising a combustion chamber adapted to produce a flame for melting the wire feedstock, wherein a radius of each rounded concave surface is equal to (0.23 divided by 0.45) times a radius of each rounded lobe.

3. A combustion wire thermal spray system, comprising:

a solid wire feedstock having a cross-sectional surface perpendicular to a feedstock feed direction with a perimeter greater than $$\frac{2}{\sqrt{\pi}}$$

times a perimeter of a circle with an interior area equal to an interior area of the cross-sectional surface;

the wire feedstock comprising a gear-shaped wire having rounded lobes and inwardly curved surfaces;

a radius of a respective rounded lobe being larger than a radius of a respective inwardly curved surface; and a combustion wire gun comprising a combustion chamber adapted to produce a flame for melting the wire feedstock.

4. The system of claim 3, wherein a ratio of the interior area to the perimeter of the wire is 7.06 divided by 13.74.

5. The system of claim 3, wherein the wire comprises six rounded lobes and six inwardly curved surfaces.

6. The system of claim 3, wherein the perimeter of the wire includes only curved surfaces.

7. The system of claim 3, wherein the perimeter is 46% greater than a circular perimeter defining a circular cross-sectional area that is equal to the interior area of the cross-sectional surface of said wire.

8. The system of claim 3, wherein each inwardly curved surface is defined by a first radius and each rounded lobe is defined by a second radius, and the first radius is equal to (1.08 divided by 3.55) times the second radius.

9. The system of claim 3, wherein the perimeter of the cross sectional surface is uniformly heatable in the combustion wire gun.

10. The system of claim 3, wherein the perimeter of the solid wire feedstock is substantially concentric about a center axis of the solid wire feedstock.

11. The system of claim 3, wherein the solid wire feedstock is formed using drawing, extruding, or forming techniques.

12. The system of claim 3, wherein the solid wire feedstock is preheated prior to being fed into the combustion wire gun.

13. The system of claim 3, wherein each rounded lobe has a circular outer surface.

14. The system of claim 3, wherein a radius of each inwardly curved surface is equal to (0.23 divided by 0.45) times a radius of each rounded lobe.

15. The system of claim 3, wherein the perimeter of the solid wire feedstock is at least 1.3 times larger than the perimeter of the circle.

16. A method of generating combustion wire thermal spray, the method comprising:

providing the combustion wire thermal spray system of claim 3;

forming the solid wire feedstock;

feeding the solid wire feedstock into the combustion wire gun of the combustion wire thermal spray system; and melting the solid wire feedstock with the flame of the combustion chamber.

17. The method of claim 16, wherein the forming comprises drawing or extruding.

18. The method of claim 16, further comprising preheating the solid wire feedstock prior to the feeding.

* * * * *